United States Patent [19]

Bucceri

[11] Patent Number: 4,742,958

[45] Date of Patent: May 10, 1988

[54] METHOD FOR MAKING ARTIFICIAL SNOW

[75] Inventor: Alfio Bucceri, Newmarket, Australia

[73] Assignee: Permasnow (Australasia) Limited, Herston, Australia

[21] Appl. No.: 887,828

[22] PCT Filed: Nov. 4, 1985

[86] PCT No.: PCT/AU85/00267

§ 371 Date: Jul. 3, 1986

§ 102(e) Date: Jul. 3, 1986

[87] PCT Pub. No.: WO86/02936

PCT Pub. Date: May 22, 1986

[30] Foreign Application Priority Data

Nov. 6, 1984 [AU] Australia .............................. PG8003
Apr. 9, 1985 [AU] Australia .............................. PH0057

[51] Int. Cl.$^4$ .......................... A01G 15/00; F25G 1/00
[52] U.S. Cl. .................................... 239/2.2; 239/14.2; 62/74
[58] Field of Search .................... 239/2.2, 14.2; 62/74, 62/347

[56] References Cited

U.S. PATENT DOCUMENTS

| | | |
|---|---|---|
| 2,800,456 | 7/1957 | Shepherd . |
| 2,968,164 | 1/1961 | Hanson . |
| 3,042,638 | 7/1962 | Dragotta et al. . |
| 3,251,194 | 5/1966 | Walker . |
| 3,257,815 | 6/1966 | Brocoff et al. . |
| 3,567,117 | 3/1971 | Eustis .................. 239/14.2 |
| 3,596,476 | 8/1971 | Archmuhle ............... 239/14.2 X |
| 3,636,725 | 1/1972 | MacCracken et al. ............... 62/235 |
| 3,751,935 | 8/1973 | MacCracken et al. ................ 62/75 |
| 3,964,682 | 6/1976 | Tropeano et al. ................... 239/2.2 |
| 4121431 | 10/1978 | Francois et al. . |
| 4,475,688 | 10/1984 | Hodges ................................. 239/2.1 |
| 4,660,388 | 4/1987 | Greene .................................. 62/261 |

FOREIGN PATENT DOCUMENTS

| | | |
|---|---|---|
| 363962 | 9/1981 | Austria . |
| 414570 | 8/1925 | Fed. Rep. of Germany . |
| 464521 | 8/1925 | Fed. Rep. of Germany . |
| 285998 | 3/1928 | United Kingdom . |

*Primary Examiner*—George E. A. Halvosa
*Assistant Examiner*—Patrick N. Burkhart
*Attorney, Agent, or Firm*—Foley & Lardner, Schwartz, Jeffery, Schwaab, Mack, Blumenthal & Evans

[57] ABSTRACT

A method of making artificial snow by mixing water with a water swellable polymer, preferably polyacrylamid, to approximately 50%-70% of the maximum water retention capacity of the polymer, aerating the mixture and freezing the mixture to produce snow crystals. The snow crystals are laid on a refrigerated floor to form a skiing slope.

18 Claims, 1 Drawing Sheet

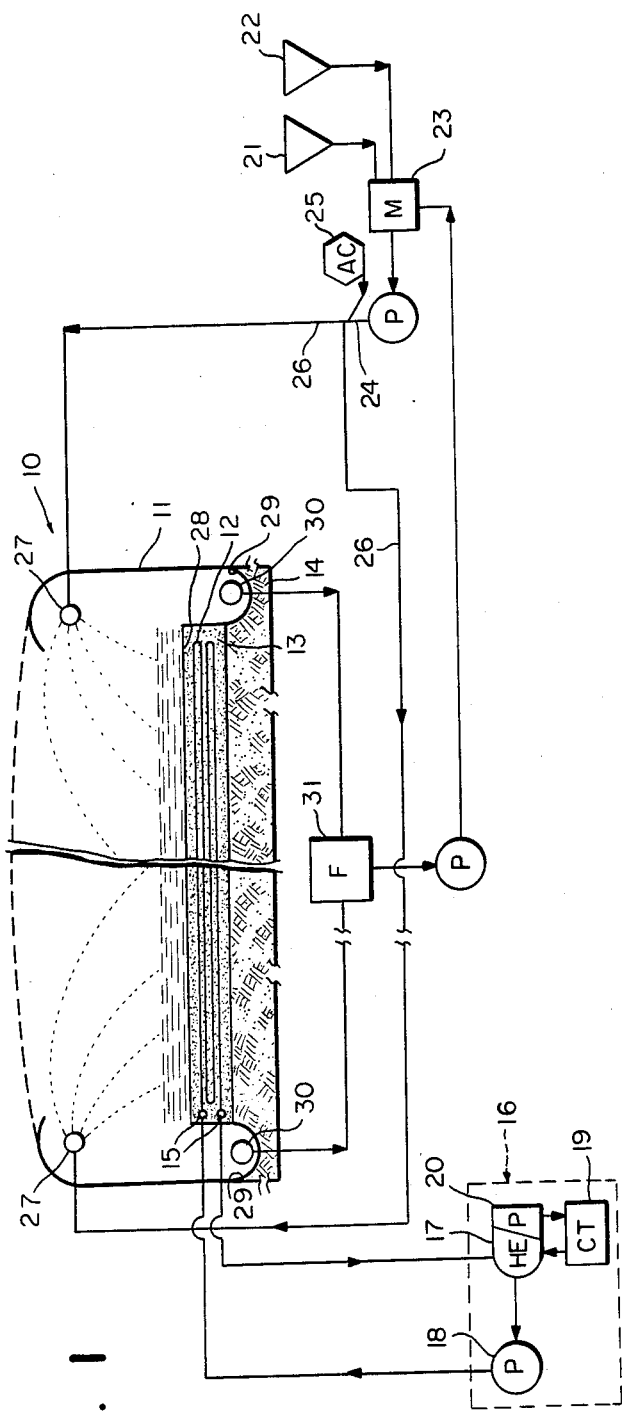

METHOD FOR MAKING ARTIFICIAL SNOW

BACKGROUND OF THE INVENTION (1) Field of the Invention

This invention relates to a method for making artificial snow, and to a skiing slope using such snow.

(2) Description of the Prior Art

In certain ski resorts around the world, artificial skiing slopes are produced by a number of different techniques.

One method is to create artificial snow by using machines which spray atomised water and compressed air (or other gas) into a subzero atmosphere to create a blanket of snow. The adiabatic expansion of the air absorbs heat from the atomised water and the particles freeze to form snow flakes. The machines are expensive to install and operate, requiring large volumes of compressed air and are only capable of producing skiable snow when both the air and ground temperatures are below 0° C. to prevent the snow from melting. In spite of the large capital and operating costs, such machines are currently in use as they can extend the skiing season by up to one month in certain resorts.

The basic method for producing snow using this type of technique was disclosed in U.S. Pat. No, 2,676,471 (Pierce). Improved methods and apparatus for this technique are disclosed in U.S. Pat. Nos. 3,716,190 (Lindlof); 3,010,660 (Barnett); 3,301,485 (Tropeano); 3,298,612 (Torrens); 3,761,020 (Tropeano et al); 3,774,843 (Rice); 3,774,842 (Howell); 3,945,567 (Rambach); 4,004,732 (Hanson); 4,083,492 (Dewey); 4,105,161 (Kircher et al); and 3,733,029 (Eustis et al) and Australian Patent Application Nos. 77956/75 (Burns) and 12534/83 (Albertson).

The atomised water particles can be fed into an airflow generated by a fan (e.g. as shown in U.S. Pat. Nos. 3,760,598 (Jakob et al) and 2,968,164 (Hanson) and the formation of the snow flakes or crystals can be accelerated by seeding with nucleating agents such as ice crystals (see U.S. Pat. No. 3,596,476 (Jakob et al) and bacteria (see U.S. Pat. No. 4,200,228 (Woerpel).

To prevent the artificial snow from melting, U.S. Pat. No. 3,893,507 (MacCracken et al) and Austrian Patent No. 363962 (Michaelis) disclose methods of freezing or cooling the ground using refrigeration systems of the type used for skating rinks and in mining. These methods do not overcome the problem of the snowflakes melting in the air and the constant refrigeration of the snow formed e.g. by the Pierce method, will eventually turn to a glaze of ice, unsuitable for skiing, as heat from the air above the snow is absorbed via the snow to the refrigeration.

In more temperate zones, artificial skiing slopes have been developed using mats, bristles or carpets of synthetic materials. Such slopes are sold under the Trade Marks "Dendex", "Delta", and "Dri-Sno" and form the subject of U.S. Pat. Nos. 3,400,643 (Holley) and 3,731,923 (Grieve) and Australian Patent Application No. 71499/74 (Snow Products Inc). These slopes require the use of special skis and poles and cannot truly recreate a snow-covered slope.

SUMMARY OF THE PRESENT INVENTION

It is an object of the present invention to provide a method for making artificial snow which is relatively simple and inexpensive.

It is a preferred object to provide a method which enables the snow to be used and maintained at temperatures not previously considered possible.

It is a further preferred object to provide a method where the snow can be laid in layers e.g. of different crystal size to recreate "powder" snow and hardpacked snow.

It is a still further preferred object to provide a method where the snow can be recovered and reused, or retreated, as required.

It is a still further preferred object to produce a ski slope incorporating the snow produced by the present method.

Other preferred objects will become apparent from the following description.

In one aspect the present invention resides in a method of making artificial snow including the steps of:

(a) mixing water with a water swellable material at less than the maximum water retention capacity of the material;

(b) aerating the mixture; and (c) freezing the mixture to form snow crystals.

Preferably the water swellable materials include all polymers, copolymers and terpolymers capable of swelling in an aqueous solution with a high gel strength. These include the polymers and copolymers of acrylamide, acrylic acid, polyacrylate salts, vinyloxazolidinane, methacrylate salts, styrene, vinyl ether and salts of styrene sulphonates, together with polymers and copolymers polymerized with cellulosic fibres. Suitable polymers are described in U.S. Pat. Nos. 3,247,171 (Walker et al); 3,022,279 (Proffitt); 3,022,280 (Shukys); and 3,251,194; British Patent Application No. 2,127,005 (Chemical Discoveries SA) and Australian Patent No. 464077 (The Dow Chemical Company).

It is more preferred that the polymer will absorb approximately 30–100 times its own weight in water to provide good gel strength, minimum evaporation and decreased permeability.

Preferably, for hard snow the water swellable polymer is mixed with the water at 30–85%, more preferably 50–70%, of its maximum water retention capacity. This may be at e.g. a nature of 50 parts water: 1 part polymer (by weight). Preferably for fine powder snow the polymer is mixed with the water at 5–50% more preferably 5–15% of its maximum water retention capacity. Such mixture may include 5–15 parts water: 1 part polymer (by weight).

A surfactant may be added to the mixture to reduce the surface tension of the water and to produce minute bubbles within the matrix of the snow crystals to create a honeycomb effect. Suitable surfactants include soap and detergents; sulphated, aliphatic or aromatic alcohols; linear or branched chain alkylbenzene sulphonates; alkylarine sulphonates; sodium dodecylbenzene sulphonate; alkyl sulphonates; and anionic, cationic and non-ionic surfactants. When anionic or cationic surfactants are used, the polymer becomes anionic or cationic and causes the snow crystals to oppose each other.

The mixture may be aerated by spraying through a nozzle or by mechanical agitation or whipping in a mixing chamber.

The mixture may be frozen at 0° C. or below, the hardness of the ice being increased with decreasing temperature as additional water within each crystal is caused to freeze. (It has been observed that the snow crystals are formed when approximately 5% of the water contained within the polymer turns to ice. A practical minimum temperature is approximately −20° C.

The snow is preferably laid on a refrigerated floor to a depth of 75-200mm, more preferably 125-150 mm to form a skiing slope. Preferably the snow is laid in layers in a manner similar to natural snow. The refrigerated floor may be of the type used for ice skating rink floors and suitable examples are described in Austrian Patent No. 363962 (Michaelis); U.S. Pat. Nos. 3,893,507; 3,379,031; 2,878,651 and 3,751,935 or the "Holmsten Rinkmaster: sold by Holmsten Ice Rinks Inc. of St. Paul, Minn., U.S.A. To control any likelihood of environmental damage should the snow melt, the floor is preferably surrounded by side walls.

The refrigeration tonnage to maintain the snow frozen will be dependent on ambient air temperatures. The top layer of the snow crystals may be shaved or removed from the slope, the crystals melted back to the gel and any foreign matter filtered out before refreezing and relaying on the slope.

In a second aspect the present invention resides in a skiing slope incorporating the artificial snow made by the above method.

BRIEF DESCRIPTION OF THE DRAWINGS

To enable the invention to be fully understood, a preferred embodiment will now be described with reference to the accompanying drawings, in which:

FIG. 1 is a part-sectional, part-schematic view of the skiing slope; and

FIG. 2 is a schematic layout of the alternative snow-crystal manufacturing equipment.

DETAILED DESCRIPTION OF THE PREFERRED EMBODIMENTS

The water swellable polymer to be mixed with the water and frozen to produce the snow crystals may be formed from the following ingredients, by way of an example:

100ml water
20 ml Acrylamide Monomer
1 ml Tetramethylethylenediamine
4 ml 7% Ammonium Persulphate
0-4 gm Methylene Bisacrylamide (0.002-0.005%)
10-50 ml detergent surfactant (optional)

The ingredients are mixed well and allowed to react exothermically to produce a highly cross-linked polymer matrix capable of retaining 50-100 times its own weight of water. The resultant gel is dried and ground into a powder or cast into flakes or granules.

The production of a skiing slope using the polyacrylamide powder will now be described with reference to FIG. 1.

The skiing slope 10 is laid out on the side of a mountain or hill to provide a downhill run.

The slope is delineated by side walls 11 which controls any run-off of the water/polymer mixture should the snow crystals melt. This avoids the likelihood of any damage to the surrounding environment.

Flexible refrigeration pipes 12 are laid in a sand bed 13 on a subsoil base 14. The refrigerant pipes are connected to respective manifolds 15, which are connected to a refrigeration unit 16. Refrigerant e.g. brine from the pipes 12 is passed through a heat exchanger 17 and returned via a brine pump 18. The heat from the refrigerant is dissipated by liquid circulated through the heat exchanger 17 and a cooling tower 19 by a pump 20.

Water, from a supply tank 21, and the polyacrylamide powder, from a supply hopper 22, are fed into a mixing chamber 23 at the rate of 50 parts water: 1 part polymer by weight and are mixed so that the polymer absorbs the water to approximately 50% of its maximum water retention capacity.

The resultant gel is pumped through a line 24 into which is injected air by an air compressor 25. From the air compressor, the aerated gel is carried through lines 26 into manifolds 27 fitted with a series of spaced nozzles which spray the aerated gel over the refrigerated floor 28 created by the refrigeration pipes 12 and sand bed 13.

As the air above the floor is below 0° C., the water in the polymer particles sprayed from the nozzles begins to freeze and the snow crystals are formed as soon as 5% of the water becomes frozen, this water forming a frozen shell around the balance of the water absorbed in the polymer particles. Because the polymer is highly cross-linked, the pores in the polymer particles are very small and so little cross-linking between the crystals, due to the presence of the ice in the crystal, occurs. The layers of snow crystals are laid approximately 25 mm thick at a time until the snow is approximately 125-150 mm thick. All the snow in these layers have the nature of natural hard packed snow.

A thin layer e.g. 6-12 mm thick of fine powder snow is then formed on top of the snow already laid. The water polymer ratio is reduced to 5-15 parts water: 1 part polymer. Because of the higher polymer content, the snow acts as an insulator against absorbing heat from the ambient air and the CO—$NH_2$ side chains absorbs UV radiation. If rain should fall, the polymer can absorb some of the water without damaging the skiing surface.

Tests have shown that by reducing the temperatures e.g. to −20° C., the percentage of water absorbed in the polymer which freezes increases e.g. to 85% and if the temperature is allowed to increase e.g. to −2° C., the ice within the frozen ice shell will melt without causing the snow crystals to break down and reform the gel. However, as the temperature is reduced, the crystals become harder due to the higher ice content.

This phenomenon leads to significant savings in the operating costs for the refrigeration unit 16. At night, when the ambient air temperature is low, the refrigeration unit can be operated to lower the snow crystal temperature to e.g. −18° C. During the day, the higher ambient air temperature heats up the crystals but provided the snow temperature does not exceed e.g. −1.8° C., the snow is unaffected. Even if the ambient temperature becomes relatively high e.g. 5-10° C., the refrigeration unit need only be operated from a short period to maintain the snow temperature below the critical temperature of e.g. −1.8° C. (The critical temperature will be dependent in part on the particular polymer used).

An insulated cover e.g. of plastics material may be supported over the slope to act as a weatherproof barrier to protect the skiers (and reduce the absorption of heat by the snow from the ambient air).

To maintain the skiing surface, a thin layer can be shaved off and placed in side drains 29 along the sides of the slope 10. The snow melts and is drawn off via pipes 30 to a filter unit 31 where any foreign matter e.g. dirt is removed. (Because the highly cross-linked polymer particles have a small pore size, little foreign matter will enter the particles). The now cleaned gel is returned to the mixing chamber 23 for return to the slope where it can be sprayed onto the existing snow in the fine powder snow layer. (It may be necessary to maintain the necessary water/polymer ratio).

By laying the refrigeration pipes 12 out in sections down the slope, the length and width of the slope can be varied throughout the year. For example, in mid-summer, the slope may be 100 meters long. As summer turns to autumn, and the ambient air temperature drops, additional sections of the slope can be provided with the artificial snow until in mid-winter, the slope may be e.g. 400-500 meters long. As spring brings warmer ambient temperatures, and natural snowfalls decrease, additional artificial snow is produced to maintain the slope at maximum length and the normal skiing season may be extended by e.g. 30 days. Then as spring turns to summer, sections of the slope may be closed.

To save costs, the melted snow can be drained off and filtered and the gel stored for next season. (If preferred, the polymer may be dried and stored in powder form).

In a modified form of the invention (see FIG. 2), the water and polymer are mixed in the mixing chamber 23 as hereinbefore described but the aerated gel is instantly frozen in a freezing unit 34 using liquid nitrogen. The resultant snow crystals can then be spread over the slope 10 and built up in layers to the desired depth.

It will be readily apparent to the skilled addressee that the embodiments described are by way of illustrative examples only. In particular, by varying the ratio of water to polymer in the described ranges, and the temperature at which the snow is frozen, the characteristics of the snow crystals can be varied. The characteristics will also be dependant on the degree of cross-linking of the polymer and the crystal size and the particular polymer used.

Various changes and modifications can be made to the embodiments described without departing from the scope of the appended claims.

I claim:
1. A method for making artificial snow comprising the steps of:
   (a) mixing water with a water swellable polymeric material at less than the maximum water retention capacity of the material to form an aqueous gel;
   (b) aerating the aqueous gel; and
   (c) freezing the aerated gel to form snow crystals.
2. A method as claimed in claim 1 wherein:
the water swellable material is a polymer, copolymer or terpolymers capable of swelling in an aqueous solution with a high gel strength.
3. A method as claimed in claim 2 wherein:
the water swellable material will absorb approximately 30-100 times its own weight in water.
4. A method as claimed in claim 2 wherein:
the water swellable material includes the polymers and copolymers of acrylamide; acrylic acid; polyacrylate salts; vinyloxazolidinane; methylacrylate salts; styrene; vinyl ether and salts of styrene sulphonates.
5. A method as claimed in claim 4 wherein the polymers and copolymers are polymerized with cellulosic fibres.
6. A method as claimed in claim 1 wherein:
for hard snow, the water swellable material is mixed with the water at 30-85% of its maximum water retention capacity.
7. A method as claimed in claim 6 wherein:
the water swellable material is mixed at 50-70% of its maximum water retention capacity.
8. A method as claimed in claim 1 wherein:
for fine powder snow, the water swellable material is mixed with the water at 5-50% of its maximum water retention capacity.
9. A method as claimed in claim 8 wherein:
the water swellable material is mixed with the water at 5-15% of its maximum water retention capacity.
10. A method as claimed in claim 2 wherein:
the water swellable material will absorb 100 times its own weight in water; and
for hard snow the water and water swellable material are mixed in the ratio 50 parts water: 1 part water swellable material by weight.
11. A method as claimed in claim 2 wherein:
the water swellable material will absorb 100 times its own weight of water; and
for fine powder snow, the water and the water swellable material are mixed in the ratio of 5-15 parts water: 1 part water swellable material by weight.
12. A method as claimed in claim 1 wherein:
the aqueous gel is aerated by mechanical agitation or compressed air or gas.
13. A method as claimed in claim 1 wherein:
the aerated gel is frozen in the temperature range of $-20°$ C. to $0°$ C.
14. A method as claimed in claim 4 wherein:
the snow crystals are formed when at least 5% of the water absorbed in the polymer, copolymer and terpolymer is converted to ice, little crosslinking occurring between the respective crystals.
15. A method as claimed in claim 1 wherein:
a surfactant is added to the aqueous gel to reduce the surface tension of the water and produce minute bubbles which create a honeycomb effect within the snow crystals.
16. A method as claimed in claim 15 wherein the surfactant includes:
soap; detergents; sulphated, aliphatic or aromatic alcohols; linear or branched chain alkylbenzene sulphonates; alkylarine sulphonates; sodium dodecylbenzene sulphonate; alkyl sulphonates; and anionic, cationic and non-ionic surfactants.
17. A method as claimed in claim 1 wherein:
the snow crystals are sprayed or laid on a refrigerated floor in layers to a depth of 75-200 mm.
18. A skiing slope including:
a refrigerated floor; and
one or more layers of snow crystals covering the floor, the snow crystals being made by the method claim 1.

* * * * *